United States Patent [19]

Anderson

[11] Patent Number: 5,775,863
[45] Date of Patent: Jul. 7, 1998

[54] HAND-OPERABLE SELF-LOCKING FASTENER

[76] Inventor: Jennifer Elisabeth Anderson, 4220 Lori Dr., Rockford, Ill. 61114

[21] Appl. No.: 846,320

[22] Filed: Apr. 30, 1997

[51] Int. Cl.$^6$ .................... F16B 21/00; F16B 21/18
[52] U.S. Cl. .................... 411/512; 411/339; 411/522; 411/908; 24/108
[58] Field of Search .................... 411/433, 512, 411/522, 338, 339, 908; 24/108, 114.05, 114.3, 297, 453

[56] References Cited

U.S. PATENT DOCUMENTS

| | | | |
|---|---|---|---|
| 2,118,361 | 5/1938 | Schaeffer, Jr. | 411/433 |
| 2,209,495 | 7/1940 | Scholfield | 411/433 X |
| 4,369,012 | 1/1983 | Bailet et al. | 411/433 |
| 5,113,553 | 5/1992 | Hutchinson | 24/108 X |

FOREIGN PATENT DOCUMENTS

| | | | |
|---|---|---|---|
| 72788 | 11/1947 | Norway | 411/433 |
| 2249804 | 5/1992 | United Kingdom | 411/339 |

*Primary Examiner*—Neill R. Wilson

[57] ABSTRACT

A fastener includes a post and a clip. The post is formed with a head and an elongated shank extending therefrom, longitudinally spaced and radially extending ribs being formed at the free end of the shank. The clip is formed with an opening for receiving the shank, a forward split collar section generally surrounding said opening, a resilient center section, and a pair of wings extending rearwardly, from the center section. When the wings are squeezed together, the shoulder sections separate for slipping over and around the free end portion of the post as the shank is received into the opening in the clip. When the wings are released, the shoulder sections resiliently return toward one another to engage the shank between two adjacent ribs for interlocking engagement between the clip and the post.

10 Claims, 3 Drawing Sheets

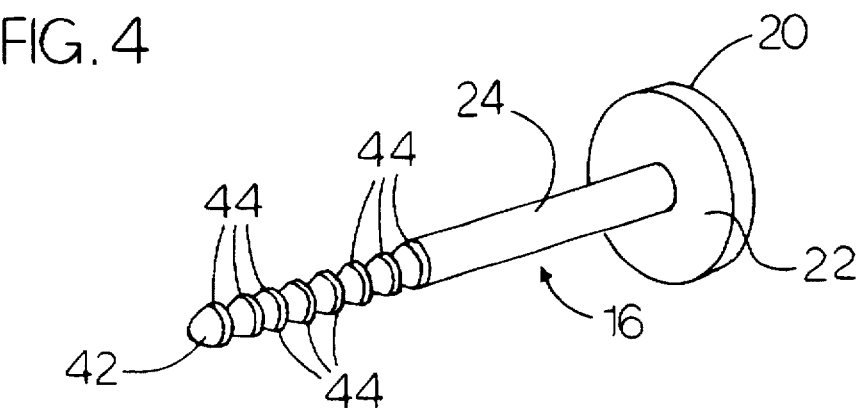
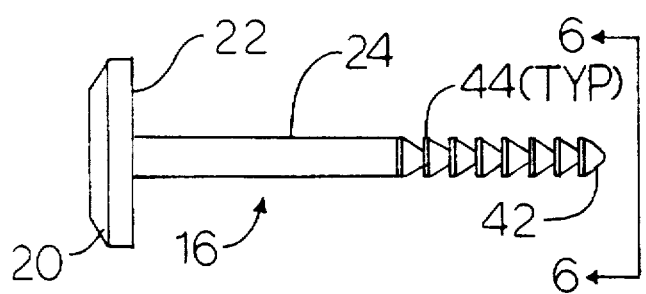
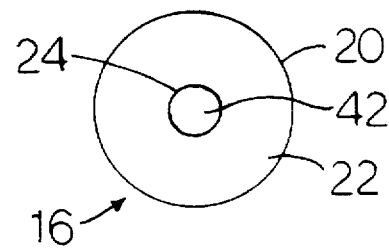
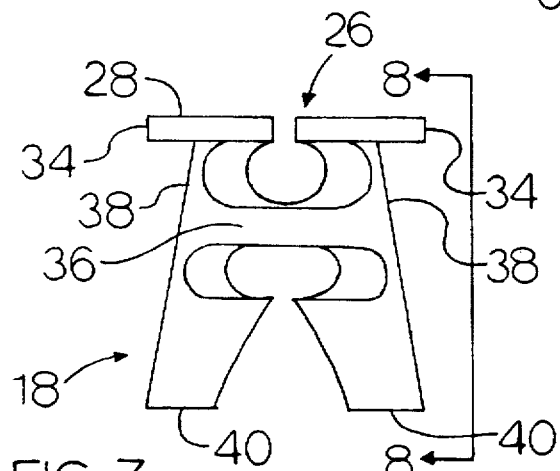
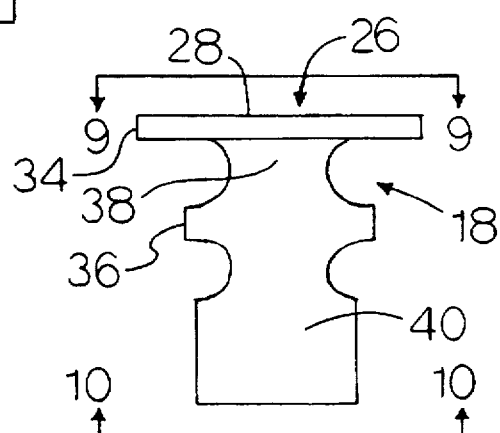
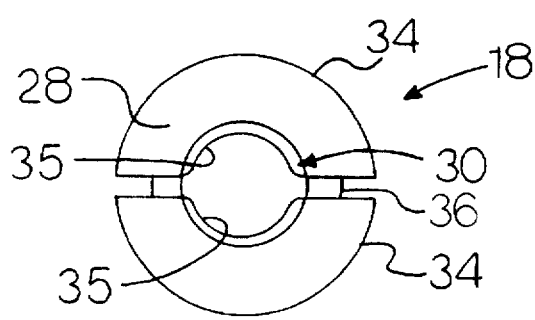
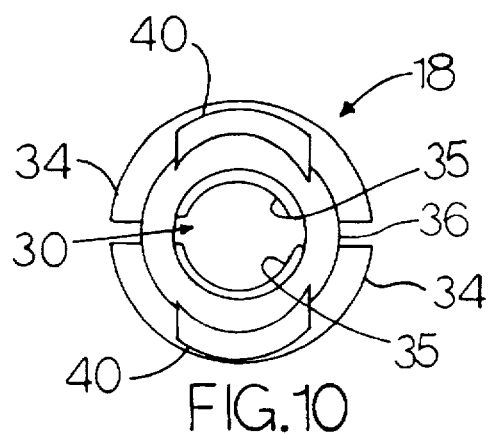

HAND-OPERABLE SELF-LOCKING FASTENER

BACKGROUND OF THE INVENTION

The present invention relates generally to two-part fasteners, and more particularly to reusable, hand-operable, self-locking fasteners for securing two or more members together.

A multitude of reusable fasteners are known and commercially available for releasably connecting two or more members together. Typical fasteners of this general type include the common threaded bolt and nut. While a nut may be installed onto a bolt by hand, as with many fasteners of this type, tools are required to secure the nut onto the bolt for securely connecting the members together.

However, there are instances when either tools are not readily available, or when the person installing the fasteners would prefer the convenience of working with fasteners which do not require the use of tools. One such instance occurs when installing signs onto sign posts along the edge of a field to identify the variety of crop growing in that field. Hand-operable, self-locking fasteners obviate the need to use and carry tools for securing the signs to the sign post.

An alternative to the conventional nut is the wing nut which may be secured to a bolt without the use of tools. In this instance, however, the bolt head and the adjacent member must be adapted such that the bolt is restricted from turning when the wing nut is tightened. In addition, the ability of the conventional wing nut to remain securely fastened to the bolt is limited by the preload that can be manually generated with the nut. If the preload is lost, the conventional wing may loosen and back-off of the bolt.

In the case of, for example, a sign fastened to a sign post, even conventional nuts which have been securely tightened with a wrench tend to loosen over a period of time due to the vibrations caused from the wind.

Another alternative is the use of a wing with a selflocking mechanism such as a conventional locking insert. Still another alternative is to use a wing nut or bolt with preformed self-locking threads. However, such self-locking fasteners are more expensive than conventional nuts and bolts, and typically can only be reused a few times.

Thus, there is a need for an improved self-locking fastener that is reusable, that is less susceptible to damage upon such reuse, and that can be securely installed and easily removed without the aid of tools.

SUMMARY OF THE INVENTION

The general aim of the present invention is to provide a new and improved hand-operable fastener which is more easily installed and removed when compared to prior fasteners of the same general type.

Another aim of the invention is to provide such hand-operable fastener equipped new and improved self-locking and quick-release mechanisms for enhanced reusability when compared to such prior fasteners.

A detailed objective is to achieve the foregoing by providing a two-part fastener in which one of the parts is adapted to be hand-actuated between a locking position for automatically locking or securing the two parts together and a release position which enables the parts to be assembled or disassembled by simply slipping the two parts together or apart.

These and other objectives and advantages of the invention will become more apparent from the following detailed description when taken in conjunction with the accompanying drawings.

In one embodiment of the invention, the fastener includes a post and a clip. The post is formed with a head and an elongated shank extending therefrom. The free end portion of the shank is formed with a series of longitudinally spaced ribs. The clip is formed with a split collar connected for resilient movement between (1) a normally closed position adapted for inter-locking engagement between two adjacent ribs to secure the post and clip together, and (2) an open or release position adapted for a clearance fit around the ribs to enable the collar to slip over the ribs for installing or removing the clip from the post. Hand-operable wings connected to the split collar enable selectively movement from the closed position to the open position to enable the clip to be quickly and easily installed onto or removed from the post.

BRIEF DESCRIPTION OF THE DRAWINGS

FIGS. 4 and 5 are perspective and side elevation views, respectively, of the fastener post.

FIG. 6 is an end view of the post taken along line 6—6 of FIG. 5.

FIGS. 7 and 8 are orthogonal side and top views, respectively, of the fastener clip, FIG. 8 being taken substantially along the line 8—8 of FIG. 2 but not showing the fastener post.

FIGS. 9 and 10 are front and rear end views, respectively, of the clip taken along the line 9—9 and 10—10 of FIG. 8.

Figure 1:
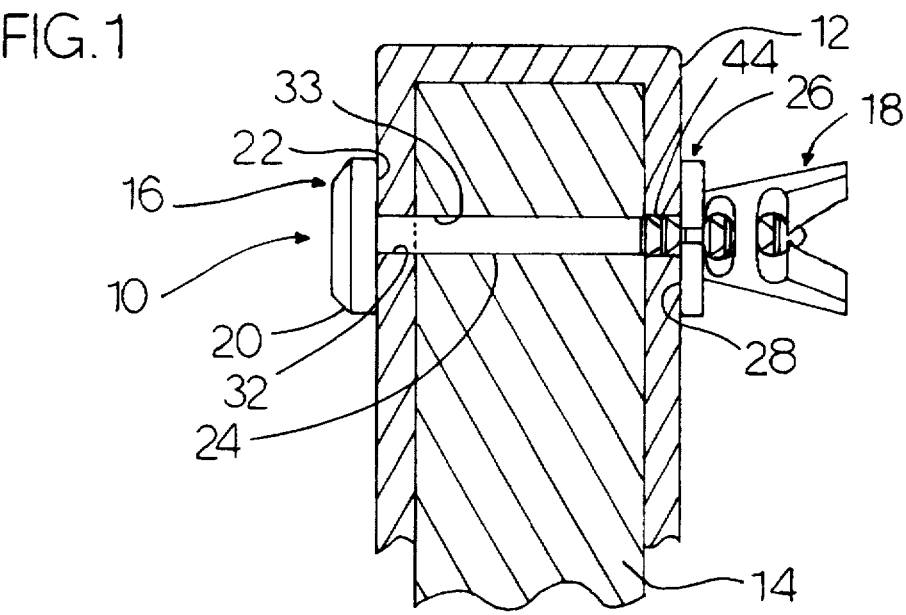
FIG. 1 is a side view of a sign secured to a sign post with a new and improved fastener incorporating the unique features of the present invention, the sign and sign post being broken away and shown in cross-section.

While the invention is susceptible of various modifications and alternative constructions, a certain illustrated embodiment has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE INVENTION

For purposes of illustration, the present invention is shown in the drawings as embodied in a fastener 10 (FIG. 1) adapted to releasably secure two or more members together such as a sign 12 to a sign post 14.

Figure 2:
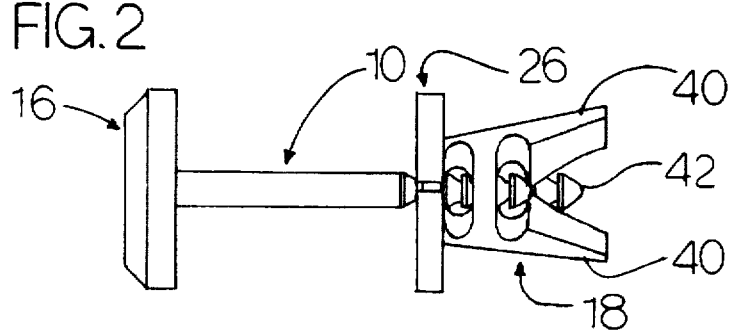
FIG. 2 is a side view of the new and improved fastener of FIG. 1.
Figure 3:
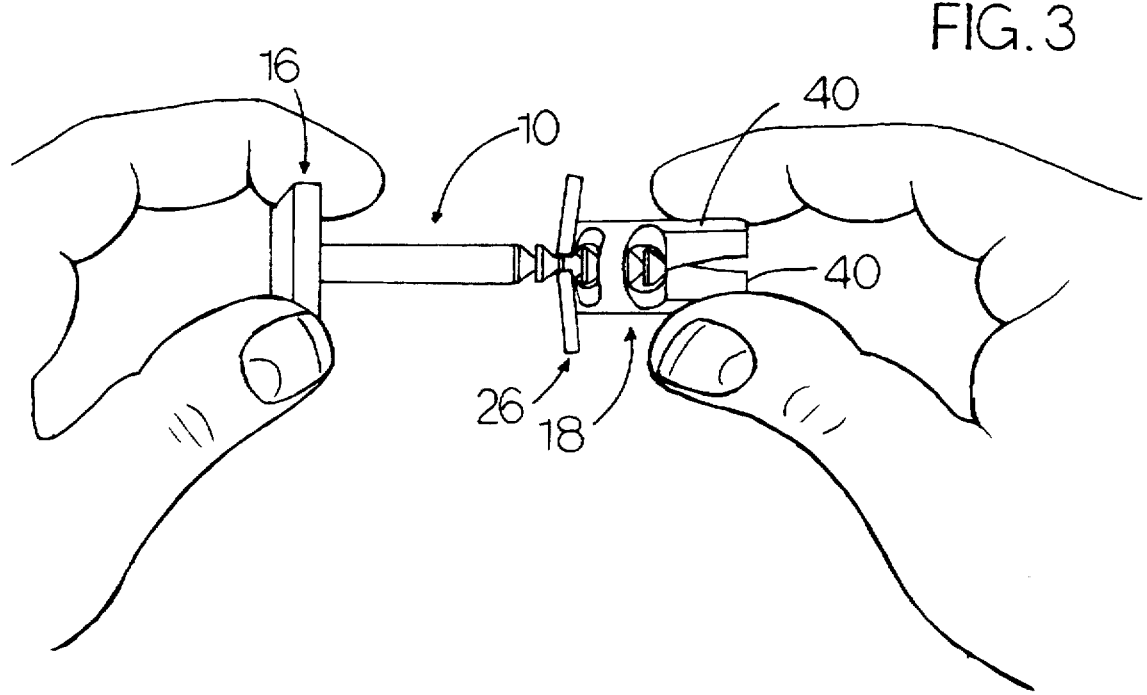
FIG. 3 is a view similar to FIG. 2 but showing a clip of the fastener manually actuated for installation onto or removal from a post of the fastener.
Figure 11:
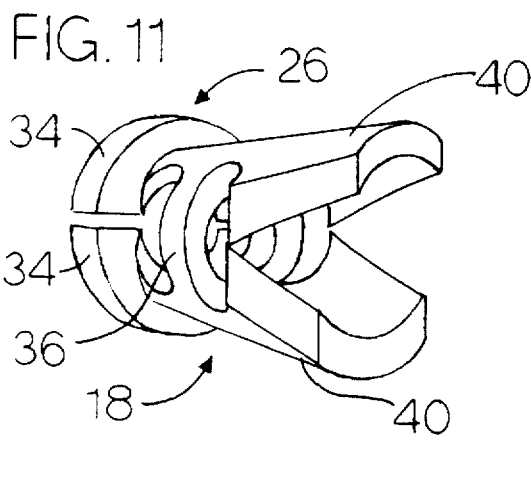
FIGS. 11 and 12 are front and rear perspective views, respectively, of the clip.
Figure 12:
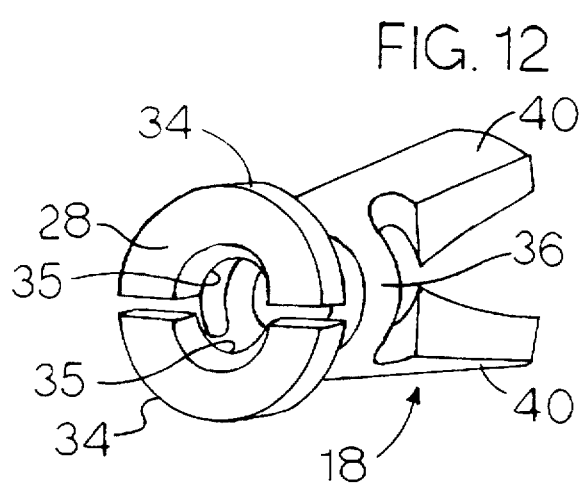

The fastener 10 (FIGS. 1–3) includes a post 16 and a clip 18. The fastener post (FIGS. 4–6) is formed with a head 20 having a contact face 22 and an elongated shank 24 extending therefrom. The clip (FIGS. 7–12) is formed with a collar 26 having a contact face 28 and an opening 30 extending therethrough for receiving the free end portion of the shank. As further described below, the collar is adapted to engage the shank of the fastener post for securing the sign and sign post between the head of the post 16 and the clip.

To this end, the sign 12 and the sign post 14 are formed with openings 32 and 33, respectively, aligned with one another and sized to slidably receive the shank 24 of the fastener post 16. The free end of the shank extends through and beyond the sign and sign post when in contacting relation as generally shown in FIG. 1. In this instance, the sign is formed having a U-shaped cross-section adapted to slip over the end of a sign post having a generally rectangular cross-section. As is apparent, however, the sign and sign post, or any other members to be secured together, can be of any convenient construction which enables openings therethrough to align with one another for receiving the shank of the fastener post. Moreover, the faces 22 and 28 shown are generally flat and are especially useful with members having flat surfaces, but may be of any curvature to provide for surface engagement with members such as the sign and sign post.

The post 16 and clip 18 may be made from any suitable material. However, with a possible outside installation in mind, for weather and corrosion resistance purposes, and for other reasons which will become apparent, the fastener post and especially the clip are preferably formed from a resilient elastic material such as molded 6/6 Nylon.

In accordance with the present invention, the collar 26 includes two opposing collar sections 34 between which the opening 30 extends and which are connected for resilient movement between (1) a normally closed position adapted for inter-locking engagement with the shank 24 of the fastener post 16, and (2) an open or release position adapted for a clearance fit around the shank to enable the clip 18 to slip onto and off of the post 16. The clip also includes manually operable wings 40 which enable temporary and selective movement of the collar sections from the closed position to the open position. As a result, the fastener 10 is quickly and easily assembled by manually opening the collar and slipping the shank of the fastener post through the enlarged opening 30, after which the collar resiliently closes for locking engagement with the post. The fastener may be disassembled by again opening the collar to disengage the collar from the shank of the post and then slipping the clip from the post.

Figure 13:
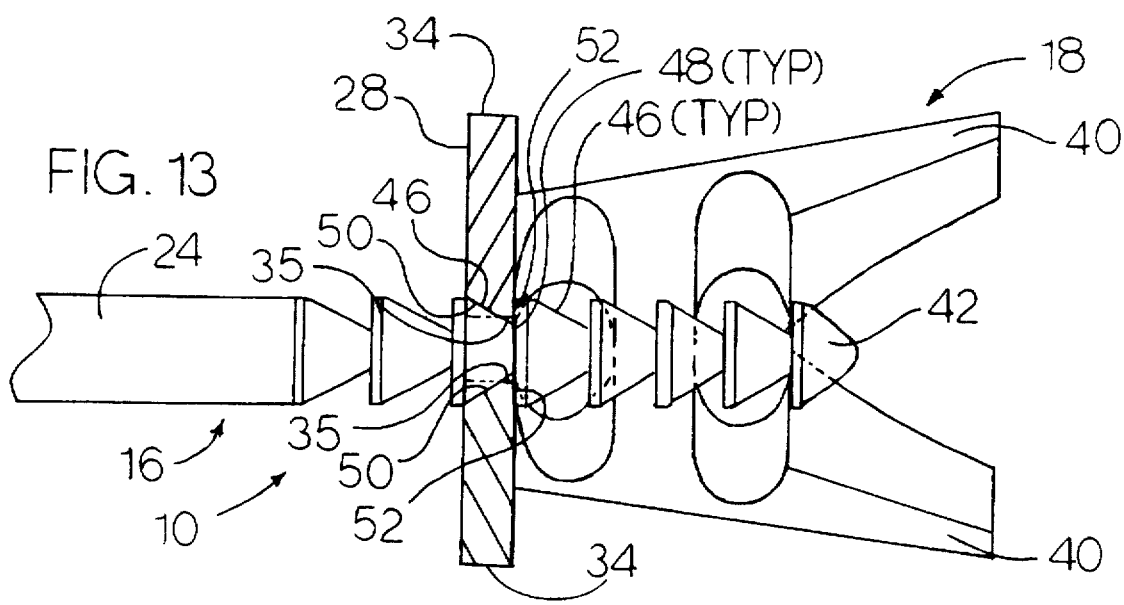
FIG. 13 is an enlarged view similar to FIG. 2 with portions of certain parts being broken away and shown in cross-section.

More specifically, the opposing collar sections 34 are sized to be received between two adjacent ribs 44 formed on the shank 24 of the fastener post 16 when in the closed position for longitudinal engagement therebetween (FIG. 13).

Thus, the opening 30 generally defined by opposing internal curved surfaces 35 on the collar sections is normally smaller than the outside major diameter of the shank. When the collar sections are manually separated, the opening 30 enlarges to provide for a radial clearance fit around the ribs (FIG. 14).

In carrying out the invention, a series of radially extending and longitudinally spaced ribs 44 are formed on the free end portion of the shank 24 such that adjacent ribs define longitudinally spaced valleys therebetween. The ribs shown are of circular cross-section, are formed with rear edge portions 46 (FIG. 13) that slope radially inwardly upon progressing rearwardly along the shank, and are formed with forwardly facing and radially extending shoulders 48 on the outer edge portion thereof. A generally tapered profile 42 (FIG. 4) formed on the free end of the shank provides a lead-in for inserting the shank into the opening 30.

In further carrying out the invention, integrally molded upper and lower resilient strips 38 connect the respective collar sections 34 with a resilient center section 36 of the clip 18, and integrally molded upper and lower wing sections 40 extend rearwardly from the center section, the wings being generally aligned with respective ones of the strips 38 and the collar sections. In the embodiment shown, the center section 36 includes a continuous band of material that is generally concentric with the centerline of the opening 30. As a result, the collar sections 34 are resiliently connected to one another and biased to the closed position, and the wings 40 are resiliently connected to the collar sections.

Figure 14:
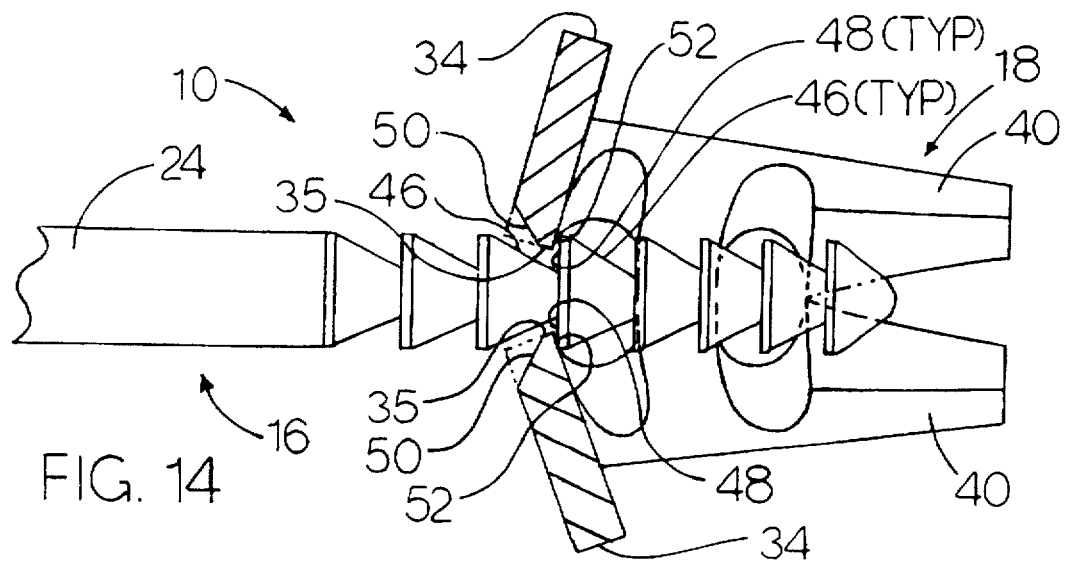
FIG. 14 is a view similar to FIG. 13 but showing the clip actuated as generally shown in FIG. 3 for assembly or disassembly of the fastener, with the portion of the clip shown in phantom lines where the post would otherwise be obscured.

In keeping with the invention, the inside diameter portion of the collar 26 is sized to be received into any one of the valleys defined between adjacent ribs on the shank 24 of the fastener post 16 (FIG. 13), and is preferably formed with a profile that is generally complimentary to the profile of the ribs for locking the clip 18 onto the post 16 after being positioned thereon (FIG. 14). To this end, each collar section 34 is formed with a forward edge portion 50 that slopes radially inwardly upon progressing rearwardly, and a radially extending and rearwardly facing surface 52 on the trailing edge thereof.

When the collar sections 34 are in the closed position, the inside diameter 35 of the surface 52 is less than the outside diameter of the shoulder 48. Thus, with the clip 18 positioned on the fastener post 16, the shoulder located rearwardly of the clip is adapted to engage the trailing edge 52 of the collar to prevent the clip from inadvertently backing off of the post.

With this arrangement, the connecting strips 38 bow outwardly and the collar sections 34 resiliently separate to snap over each successive rib 44 as inclined surfaces 50 on the clip 18 engage and slide outwardly along each successive complimentary inclined surface 46 on the shank 24. As a result, the sign 12 can be securely connected to the sign post 14 by inserting the shank of the post 16 through the openings 32, 33, holding the head 20 snugly against the front of the sign, and then pushing the clip onto the shank until the clip is snugly positioned against the back of the sign. With the clip positioned on the post, the connecting strips resiliently return the collar sections inwardly to the closed position between the two adjacent ribs closest to and rearwardly of the sign. Therefore, the clip is automatically trapped into inter-locking engagement between the sign and the rib rearwardly of the collar when positioned on the fastener post As will be apparent, the length of the post and the series of ribs formed thereon provide for a fastener having a variable gripping length to permit the post to be used in securing members having a material thickness within a predetermined range.

In further carrying out the invention, the wings 40 are adapted to effect manual separation of the collar sections 34 for selectively disengaging the collar from the fastener post 16. Specifically, the collar sections pivot resiliently outwardly about the center band 36 to the open position when the wings are squeezed together. Moreover, the wings are adapted to effect separation of the collar sections even if the shank 24 extends past the center section 36 of the clip 18 and between or past the wings. To this end, the wings shown slope radially outwardly upon progressing rearwardly from the center section to provide for radial clearance between the shank and the collar sections when the wings are squeezed together to a diameter slightly greater than the diameter of the shank. Thus, with the clip positioned on the fastener post, the wings enable separation and positioning of the inside surfaces 35 outwardly of the ribs 44 as shown in FIG. 14 for disengaging the collar sections from the shank of the post.

With this arrangement, removal of the clip 18 from the fastener post 16 is accomplished by simply squeezing the wings 40 together as previously described to separate the collar sections 34 from the ribs 44, and then slipping the clip off of the post while holding the wings together. Advantageously, squeezing the wings together enhances the ease of installing the clip 18 onto the fastener post 16 by enabling the shank 24 to simply slip through the temporarily enlarged opening 30.

From the foregoing, it is apparent that the present invention brings to the art a new and improved fastener 10. By virtue of the ribs 44 formed on the shank 24 of the post 16, and the uniquely configured clip 18 including the split collar 34 resiliently biased to a closed position and manually operable wings 40 which enable selective movement of the collar to an open position, the clip is capable of being quickly and easily assembled into or disassembled from inter-locking engagement with the fastener post without degradation to the locking mechanism of the fastener and without the need for tools.

I claim:

1. A fastener comprising:

an elongated shank having a plurality of longitudinally spaced ribs formed with generally forwardly facing shoulders;

a clip having at least two collar sections connected for movement between first and second positions relative to one another and relative to said shank;

said collar sections having generally rearwardly facing surfaces sized for rearwardly locking engagement with at least one of said shoulders when in said first position, said collar sections being resiliently biased to said first position and adapted to snap past successive shoulders when said clip is pushed forwardly into engagement with said shank; and lever means connected to respective ones of said collar sections to effect selective movement of said collar section to said second position.

2. A fastener as defined in claim 1 in which said shoulders are formed with generally rearwardly facing chamfer portions and said collar sections are formed with complimentary and generally forwardly facing chamfer portions, said chamfer portions slidably engaging to cause said collar sections to move toward said second position as said clip is pushed forwardly into engagement with said shank.

3. A fastener as defined in claim 1 in which said collar sections are resiliently connected for movement between said positions.

4. A fastener as defined in claim 3 in which said collar sections are resiliently connected to one another.

5. A fastener as defined in claim 4 in which said clip includes a resilient section integrally formed between said collar sections.

6. A fastener as defined in claim 5 in which said lever means are integrally formed with said resilient section.

7. A fastener as defined in claim 1 in which said collar sections are in clearing relation with said shoulders when in said second position for removal of said clip from said shank.

8. A fastener as defined in claim 7 in which said collar sections are generally opposing and adapted to receive the shank therebetween, said collar sections being connected for movement inwardly and outwardly from said shank such said collar sections are outwardly of said shoulders when in said second position.

9. A fastener comprising:

a post having a head and having an elongated shank extending rearwardly therefrom, the free end portion of said shank being formed with longitudinally spaced and radially extending ribs; and a clip having a resilient center section and opposing collar sections connected to said center section for resilient movement between first and second positions, there being an opening extending between said collar sections for receiving the free end of said shank, said collar sections being biased to said first position and being sized to be slidably received between adjacent ones of said ribs for longitudinal engagement therebetween when said first position, said collar sections being in a clearance position radially outwardly of said ribs when in said second position, said clip further having opposing wings connected to said center section for movement inwardly and outwardly relative to one another, said wings being generally aligned with said collar sections and selectively separating said collar sections as said wings are squeezed toward one another for movement of said collar sections outwardly from between said ribs;

said ribs having a forwardly facing shoulder portion and a rear lead-in portion, said collar sections having a forward chamfer portion and a rear lip portion adapted to engage said shoulder portion for preventing rearward movement of said clip when said collar sections are positioned between adjacent ones of said ribs.

10. A fastener as defined in claim 9 in which said collar sections and said ribs are formed having generally complimentary cross-sectional shapes.

* * * * *